United States Patent Office 2,969,357
Patented Jan. 24, 1961

2,969,357
PENICILLIN SALTS OF AMINO SALICYLATES

Walter Grimme, Utfort, Werner Keil, Moers, and Heinrich Schmitz, Moers-Meerbeck, Germany, assignors to Rheinpreussen Aktiengesellschaft für Bergbau und Chemie, Homberg, Germany a corporation of Germany No Drawing. Filed Aug. 31, 1954, Ser. No. 453,408

Claims priority, application Germany Nov. 16, 1950

1 Claim. (Cl. 260—239.1)

This invention relates to new, improved penicillin salts and is a continuation-in-part of U.S. application Serial No. 255,748, filed November 9, 1951, now U.S. Patent No. 2,701,796, issued on February 8, 1955. It more particularly relates to difficultly soluble penicillin salts of amino salicylates.

Certain penicillin salts, such as the penicillin salts of procaine are known. These salts are produced, for example, by reacting procaine hydrochloride with the sodium salt of benzyl or n-amyl penicillin in an aqueous solution. This reaction is set forth in Charles I. Salivar, F. Howard Hedger and Ellis V. Brown, Journal of the American Chemical Society, vol. 70, 1948, pages 1287–1288. These known penicillin salts have, in addition to anaesthesizing properties, a prolongated pencillin action.

One object of this invention is penicillin salts having high anaesthesizing action and superior therapeutic properties to the previously known salts. This, and still further objects, will become apparent from the following description:

It has now been found that penicillin compounds of superior therapeutic properties are obtained by the reaction of penicillin with certain amino-salicylates of amino-alcohols.

In accordance with the invention, difficultly soluble crystallized or oily penicillin compounds are produced by reacting a penicillin with an ester obtained from 4-amino-salicylic acid and an amino-alcohol having the general formula:

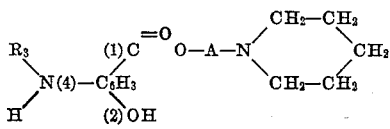

in which $R_3$ may be any of hydrogen atoms or alkyl or phenyl alkyl groups which may contain up to 10 carbon atoms, the alkyl groups containing preferably up to 4 carbon atoms.

In the formula A represents an aliphatic hydrocarbon radical having a straight or branched chain containing 2 to 5 carbon atoms. Although the size of this carbon chain does not have any essential influence on the pharmacological properties of the final product produced, it has been found for practical purposes extremely simple to start from esters in which the A group is a dimethylene group $-CH_2-CH_2-$.

The amino-salicylic acids used in accordance with the invention may be, for example, 4-amino-2-hydroxybenzoic acid,
4-n-propylamino-2-hydroxybenzoic acid,
4-n-butylamino-2-hydroxybenzoic acid,
4-benzylamino-2-hydroxybenzoic acid, as well as other substituted 4-amino-salicyclic acids.

An amino-alcohol which may be used for the esterification, may, for example, be β-piperidino-ethanol, γ-piperidino-propanol, or 3-piperidino-1-methyl-propanol-(1).

The esters of these aforementioned amino-salicylic acids and amino-alcohols may be reacted in accordance with the invention in the form of their ester bases or in the form of their salt with an inorganic or organic acid.

The penicillin used in accordance with the invention may be any penicillin salt or free penicillin acid.

The new penicillin compounds obtained in accordance with the invention by the reaction of these ester bases or salts with the penicillin salts or free penicillin acids, have the general formula

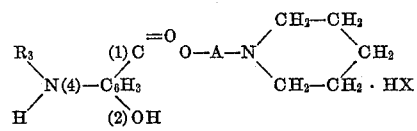

in which HX is any desired penicillin in the form of its acid. The new compounds show a surprising improvement over the previously known procaine penicillin salts and the fundamental antibiotic properties of the penicillin used are not changed.

The penicillin component in accordance with the invention may be any desired penicillin having the general formula

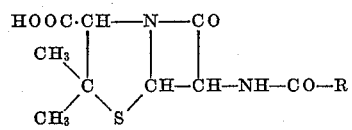

in which R is an organic radical. When penicillin G is used, the R would be represented by a $-CH_2-C_6H_5$ (benzyl). When penicillin F is used, the R would be represented by $-CH_2-CH=CH-CH_2CH_3$ (pentenyl). When dihydro-F penicillin is used, the R would be represented by $-CH_2-CH_2-CH_2-CH_2-CH_3$ (n-amyl). When penicillin K is used, the R would be represented by $-CH_2-CH_2-CH_2-CH_2-CH_2-CH_2-CH_3$ (n-heptyl).

During the reaction, the penicillin acid group represented by the carboxyl radical, is added to the nitrogen atom of the ester group $-COO-A-NC_5H_{10}$ of the amino-salicylic acid ester. The two reaction components, i.e. the penicillin and the amino-salicylate, are preferably used in equivalent amounts.

The reaction of the penicillin and the amino-salicylate for the preparation of the new penicillin compounds may be effected so that a salt of the amino-salicylate is reacted in water or in an organic solvent with the penicillin salt. The new penicillin compounds will then separate out as an insoluble or difficultly soluble substance. The new penicillin compounds in accordance with the invention constitute in part crystalline or amorphous and in part oily substances. The preparation in accordance with the invention may also be effected in such a manner that the amino-salicylate is brought as a free base into reaction with a penicillin in the form of its acid in a solvent. In connection with these reactions it is preferable to use the amino-salicylate in at least equimolecular quantity. A single amino-salicylate and a single penicillin may be contacted for the reaction in accordance with the invention. It is also possible to use for the new reaction mixtures of these substances.

The reaction is effected by the mere contacting of the penicillin and the amino-salicylate, preferably in the presence of solvents. Suitable solvents for use in accordance with the invention are, for example, water, hydrocarbons such as hexane and benzene, halogenated hydrocarbons such as chloroform and secondary butyl chloride, alcohols such as ethanol and isopropanol, esters such as ethylacetate and butylacetate, ethers such as di-ethyl ether and di-isopropyl ether, ketones such as acetone and methyl ethyl ketone, or mixtures of these solvents.

These new penicillin compounds obtained in accordance with the invention exhibit surprising and unexpected qualities as compared with the previously known penicillin compounds, as for example the penicillin procaine salts. The new compounds exhibit an excellent tolerability and a high anaesthesizing action. The excellent tolerability of these compounds is present in addition to an extremely high penicillin depot action, which renders them especially valuable. In addition, these new penicillin compounds have therapeutically valuable properties which cannot be obtained in the same manner with other compounds of penicillin.

The new compounds in accordance with the invention are characterized in part by their difficulty in dissolving. In this way, these compounds may be obtained from penicillin or their salts of low concentration and/or low purity, such as penicillin culture medium, in a good yield and in a form which may be used for therapeutic purposes. This enables the discarding of a large number of enrichment and purification stages which are otherwise customary in the industrial preparation of penicillin.

The following examples will serve to illustrate a method for the preparation of the new penicillin compounds and are given solely for illustration and not limitation:

EXAMPLE 1

*Penicillin-G-salt of β-piperidino-ethyl-2-oxy-4-amino benzoate*

4.66 grams of β-piperidino-ethyl 2-oxy-4-amino benzoate hydrochloride are dissolved in 150 cc. of water. The solution is added to the solution of 5.55 grams of penicillin G sodium in 10 cc. of water. After setting aside in a refrigerator for several days, the reaction product which has precipitated out is filtered off. By concentration of the mother liquor in a vacuum there are obtained further quantities of the product, having the following characteristics:

Melting point 104–106° (decomposition).

*Analysis.*—$C_{30}H_{38}O_7N_4S$. Computed: N, 9.36%; S, 5.35%. Found: N, 9.54%; S, 5.15%.

EXAMPLE 2

*Penicillin-G-salt of the 4-amino-2-hydroxy-benzoic acid-γ-1-piperidinopropyl ester*

3.7 grams of penicillin G potassium are dissolved in 50 cc. of water. On acidification with dilute sulfuric acid to a pH value of 3–4, the separated oily penicillin G is dissolved by successive shaking with two portions of 30 cc. butyl acetate each. The extracts are combined. To this solution, which contains 1/100 mol of penicillin G, is added a solution of 2.8 grams of γ-1-piperidinopropyl ester of 4-amino-2-hydroxy-benzoic acid, fusing at 58° C., in 20 cc. of butyl acetate. By evaporating the solvent under vacuum at 25–30° C., the amorphous penicillin-G-salt of the ester is recovered. The product is almost purely white in appearance. When heated to temperatures above 50° C., it changes to the liquid state and is gradually decomposed.

*Analysis.*—$C_{31}H_{40}O_7N_4S$. Calculated: N, 9.14%; S, 5.22%. Found: N, 9.03%; S, 4.98%.

EXAMPLE 3

*Penicillin-G-salt of the 4-n-butylamino-2-hydroxy-benzoic-acid-piperidinoethyl ester*

3.6 grams of hydrochloride of the 4-n-butylamino-2-hydroxy-benzoic acid-piperidinoethyl ester, having the fusing point 134° C., are dissolved in 50 cc. of water while heating. After alkalifying the solution with solid potassium carbonate, the separated ester is dissolved in 20 cc. of amyl acetate. The solution is separated from the aqueous phase and dried. Upon filtration, it is added to a solution of 3.3 grams of penicillin G in 20 cc. of amyl acetate, whereupon the solvent is evaporated under vacuum at 25–30° C. The residue obtained is the amorphous penicillin-G-salt of the 4-n-butylamino-2-hydroxy-benzoic acid-piperidinoethyl ester, faintly yellow in color. At temperatures above 45° C., the product gradually changes to the oily state and is decomposed on prolonged heating.

*Analysis.*—$C_{34}H_{46}O_7N_4S$. Calculated: C, 62.35%; H, 7.07%; N, 8.56%. Found: C, 61.93%; H, 6.89%; N, 8.38%.

EXAMPLE 4

*Penicillin-G-salt of the 4-n-propylamino-2-hydroxy-benzoic acid-α-methyl-γ-1-piperidinopropyl ester*

3.3 grams of the oily 4-n-propylamino-2-hydroxy-benzoic acid-α-methyl-γ-1-piperidinopropyl ester are dissolved in 15 cc. of secondary butyl acetate. To this solution is added a solution of 3.3 grams of penicillin G in 20 cc. of secondary butyl acetate. On evaporating the solvent under vacuum at 25–30° C., there is obtained the ester salt of the penicillin G as an amorphous substance. The product is faintly yellow in color. When heated to 45–50° C., it gradually changes to the oily state and is decomposed on prolonged heating to temperatures above 50° C.

*Analysis.*—$C_{35}H_{48}O_7N_4S$. Calculated: N, 8.38%; S, 4.79%. Found: N, 8.22%; S, 4.53%.

EXAMPLE 5

*Penicillin-K-salt of the 4-benzylamino-2-hydroxy-benzoic acid-piperidinoethyl ester*

3.9 grams of hydrochloride of the 4-benzylamino-2-hydroxybenzoic acid-piperidinoethyl ester are dissolved in 30 cc. of water while heating. After alkalifying the solution with solid sodium carbonate, the separated oily ester is dissolved in 20 cc. of butyl acetate. The aqueous phase is separated and the butyl acetate solution dried. To the latter is added a solution of 3.3 grams of penicillin K in 20 cc. of butyl acetate. By evaporating the solvent under vacuum at 25–30° C., there is obtained the amorphous, faintly yellow colored penicillin-K-salt of the aforementioned ester. The product changes to the oily state above 45° C. and is then gradually decomposed.

*Analysis.*—$C_{37}H_{44}O_7N_4S$. Calculated: N, 8.14%; S, 4.65%. Found: N, 7.93%; S, 4.37%.

We claim:

As a new chemical compound, a penicillin salt of an amino-salicylate having the general formula:

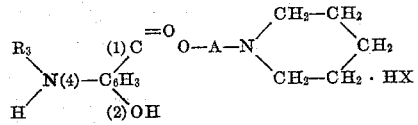

in which HX is penicillin in the form of its acid; $R_3$ is a radical containing not in excess of 10 carbon atoms and selected from the group consisting of hydrogen, alkyl, and phenylalkyl radicals; and A is a saturated aliphatic hydrocarbon radical having 2 to 5 carbon atoms.

References Cited in the file of this patent

UNITED STATES PATENTS

| | | |
|---|---|---|
| 2,493,625 | Goldberg et al. | Jan. 3, 1950 |
| 2,547,640 | Goldman | Apr. 3, 1951 |
| 2,701,796 | Grimme et al. | Feb. 8, 1955 |

FOREIGN PATENTS

| | | |
|---|---|---|
| 506,999 | Belgium | Nov. 30, 1951 |

OTHER REFERENCES

Leigh: Discussions Faraday Soc., vol. 7 (1949), p. 312.